United States Patent
Diez (10) Patent No.: US 7,806,414 B2
(45) Date of Patent: Oct. 5, 2010

(54) CYLINDER HEAD GASKET

(75) Inventor: Armin Diez, Lenningen (DE)

(73) Assignee: ElringKlinger AG, Dettingen (DE)

( * ) Notice: Subject to any disclaimer, the term of this patent is extended or adjusted under 35 U.S.C. 154(b) by 877 days.

(21) Appl. No.: 10/419,368

(22) Filed: Apr. 21, 2003

(65) Prior Publication Data

US 2004/0012155 A1 Jan. 22, 2004

(30) Foreign Application Priority Data

Apr. 24, 2002 (DE) ............................. 102 18 245

(51) Int. Cl.
F02F 11/00 (2006.01)
(52) U.S. Cl. .................................... 277/593
(58) Field of Classification Search ......... 277/591–595, 277/598
See application file for complete search history.

(56) References Cited

U.S. PATENT DOCUMENTS

| | | | |
|---|---|---|---|
| 5,568,932 A | 10/1996 | Tanaka et al. | 277/180 |
| 5,690,343 A | 11/1997 | Takada et al. | 277/235 B |
| 6,164,662 A * | 12/2000 | Uemura et al. | 277/593 |
| 6,168,167 B1 * | 1/2001 | Aoki | 277/595 |
| 6,457,724 B2 * | 10/2002 | Ogaeri et al. | 277/595 |
| 7,017,918 B2 * | 3/2006 | Barclay et al. | 277/593 |
| 2002/0011709 A1 | 1/2002 | Jinno et al. | 277/593 |
| 2002/0170521 A1 | 11/2002 | Hilgert | 123/193.5 |
| 2003/0168818 A1 | 9/2003 | Pepin | 277/593 |
| 2004/0041352 A1 * | 3/2004 | Hohe et al. | 277/593 |

FOREIGN PATENT DOCUMENTS

| | | |
|---|---|---|
| DE | 36 31 887 | 2/1988 |
| DE | 19513360 C1 * | 6/1996 |
| DE | 196 34 964 | 3/1997 |
| DE | 19719328 C1 * | 6/1998 |
| DE | 197 49 054 A1 | 6/1999 |
| DE | 197 49 053 | 9/1999 |
| DE | 197 49 054 | 10/1999 |
| DE | 199 28 602 | 1/2001 |
| DE | 199 28 602 A1 | 1/2001 |
| DE | 100 05 455 A1 | 10/2001 |
| DE | 10029352 A1 * | 12/2001 |
| EP | 0 915 272 A2 | 5/1999 |
| EP | 1 111 277 A2 | 6/2001 |
| EP | 1 111 277 A3 | 7/2002 |
| EP | 1 340 010 B1 | 9/2003 |
| FR | 2 814 777 | 4/2002 |
| JP | 04307178 A * | 10/1992 |
| JP | 2002174142 A * | 6/2002 |

* cited by examiner

Primary Examiner—Vishal Patel (57) ABSTRACT

In order to provide a cylinder head gasket, comprising at least one gasket sheet, with at least one combustion chamber opening and a combustion chamber bead, the height of which may be elastically deformed and surrounds the combustion chamber opening, and at least one deformation limiting means limiting the deformation of the combustion chamber bead, wherein the deformation limiting means assures adequate protection of the combustion chamber bead and adequate sealing surface pressure over a wide range of operating conditions of the engine, it is proposed that the cylinder head gasket comprises a compensation means which comprises at least one compensation element, the height of which varies essentially reversibly when the operating status of the engine changes, and which at least partially supports both the combustion chamber bead and the deformation limiting means.

33 Claims, 4 Drawing Sheets

CYLINDER HEAD GASKET

The present disclosure relates to the subject matter disclosed in German Patent Application No. 102 18 245.0 of Apr. 24, 2002, the entire specification of which is incorporated herein by reference.

The present invention relates to a cylinder head gasket, which comprises at least one gasket sheet with at least one combustion chamber opening and a combustion chamber bead, the height of which may be elastically deformed and surrounds the combustion chamber opening, and at least one deformation limiting means limiting the deformation of the combustion chamber bead.

Such a cylinder head gasket is known from the prior art.

The combustion chamber bead is protected from an impermissible deformation as a result of the deformation limiting means, frequently also referred to as a stopper. At the same time, the deformation limiting means forms a partially thickened section of the gasket, as a result of which the engine components adjoining the cylinder head gasket are so prestressed that the dynamic sealing gap oscillation is reduced.

In order to reliably exclude an impermissible deformation of the combustion chamber bead, the stopper is generally rigid in construction.

Since the rigidity of the engine components adjoining the cylinder head gasket varies in the peripheral direction of the combustion chamber opening, the distribution of pressure in the region of the deformation limiting means is also uneven, which can lead to gas leakages from the combustion chamber. Therefore, height profiling of the deformation limiting means can be provided to even out the pressure.

The deformation limiting means is designed for a specific operating status of the engine. If the local sealing gap height changes as a result of changes in temperature of the engine components adjoining the cylinder head gasket and the resulting locally different thermal expansion values, then the deformation limiting means is no longer optimally adapted to these new operating conditions.

Therefore, the object forming the basis of the present invention is to provide a cylinder head gasket of the aforementioned type, in which the deformation limiting means assures adequate protection of the combustion chamber bead and adequate sealing surface pressure over a wide range of operating conditions of the engine.

This object is achieved according to the invention with a cylinder head gasket with the features of the preamble of Claim 1 in that the cylinder head gasket comprises a compensation means which comprises at least one compensation element, the height of which varies essentially reversibly when the operating status of the engine changes, and which at least partially supports both the combustion chamber bead and the deformation limiting means.

In this case, the height of the element within the scope of this description and the attached claims should be understood to mean the expansion of the respective element in a direction perpendicular to the main faces of the gasket sheet of the cylinder head gasket.

An essentially reversible change in the height of an element is a change, which is essentially reversed again when the operating status of the engine returns to the initial status.

The basic concept of the solution according to the invention is allow dynamic sealing gap oscillations acting on the combustion chamber bead and the deformation limiting means to undergo, in the event of a change in operating status of the engine, a smaller change with respect to operating status than would be the case without the compensation means.

Ideally, the changes in dynamic sealing gap oscillations are virtually completely compensated by the compensation means, so that the combustion chamber bead and the deformation limiting means associated therewith are subjected to essentially the same pressure conditions in each operating status of the cylinder head gasket.

As a result, the structure of the deformation limiting means, in particular a height and breadth profiling thereof, can be optimised for these essentially constant pressure conditions.

In particular, it can be provided that the height of the compensation element varies as a function of the temperature of the engine components adjoining the cylinder head gasket.

It can be further provided that the height of the compensation element varies as a function of the local surface pressure acting on the cylinder head gasket.

Even a change in temperature can cause a change in local surface pressure, if the engine components adjoining the cylinder head gasket have locally different thermal expansion values.

Since the compensation means is not for compensation of the sealing gap oscillations themselves, but merely the variation in the average sealing gap height, which occurs in the event of a change in operating status, it is advantageously provided that the height of the compensation element follows a change in the operating status of the engine with a relaxation time, which is greater than one work cycle of the engine.

It is beneficial if the relaxation time is greater than $\frac{1}{10}$ of a second, preferably greater than 1 second, in particular greater than 1 minute.

To enable changes in the sealing gap height dependent on operating status varying in the peripheral direction of the combustion chamber opening to be compensated, it is provided in a particular configuration of the invention that the compensation element extends in the longitudinal direction of the combustion chamber bead, and that the change in height of the compensation element varies in the longitudinal direction of the compensation element as a function of the operating status of the engine.

Since it is more important to compensate the variations in sealing gap change in the peripheral direction of the combustion chamber opening than the change in height of the sealing gap averaged over the periphery of the combustion chamber opening, it is provided in a particular configuration of the invention that the change in height of the compensation element dependent on operating status averaged over the entire length of the compensation element is essentially zero.

This can be achieved in particular as a result of flowable material contained in the compensation element flowing from a location, at which the sealing gap does not increase, or only slightly, with a change in operating status to a location, at which the height of the sealing gap increases more severely with the respective change in operating status.

In order to achieve that the combustion chamber bead is held at a virtually constant shunt value with the deformation limiting means, it is preferably provided that the compensation means comprises at least one compensation element, which at least partially supports both the combustion chamber bead and the deformation limiting means. This enables the contact region of the bead to move in resilient manner jointly with the deformation limiting means.

Alternatively or in addition to this, it can also be provided that the compensation means comprises at least one compensation element, which at least partially supports the combustion chamber bead, and at least one further compensation element, which at least partially supports the deformation limiting means.

In any case it is advantageous if the total height of the compensation elements supporting the combustion chamber bead is essentially equal to the total height of the compensation elements supporting the deformation limiting means.

The compensation means preferably comprises at least one compensation sheet, which differs from the gasket sheet of the cylinder head gasket provided with the combustion chamber bead.

In particular, it can be provided that the compensation means comprises at least two compensation sheets, which differ from the gasket sheet of the cylinder head gasket provided with the combustion chamber bead.

The compensation means can be substantially mirror-symmetric to a central plane of thereof.

The configuration of the compensation elements has not been explained in more detail so far.

Therefore, it can be provided, for example, that the compensation means comprises a compensation element which is elastically changeable in height.

In particular it can be provided that the compensation means comprises at least one compensation bead, which is preferably elastically changeable in height.

The compensation bead preferably has a higher rigidity, i.e. a higher spring constant, than the combustion chamber bead.

To enable the combustion chamber bead to be supported with such a compensation bead, it is advantageously provided that an outer bead edge of the compensation bead runs at a greater distance from the central point of the combustion chamber opening than an inner bead edge of the combustion chamber bead.

To enable the deformation limiting means to be supported by the compensation bead, it is advantageously provided that an inner bead edge of the compensation bead runs at a shorter distance from the central point of the combustion chamber opening than an outer edge of the deformation limiting means.

In preferred configurations of the cylinder head gasket according to the invention the compensation means comprises at least two compensation beads.

These two compensation beads can be provided on the same compensation sheet of the compensation means.

It is also possible that at least two compensation beads are provided on two different compensation sheets of the compensation means.

In particular, the compensation beads are configured as full beads, the domes of which face one another.

Alternatively, it can be provided that the compensation beads are in the form of full beads, the domes of which face away from one another.

In order to form a damped-elastic compensation element, it can be provided that the compensation means comprises at least one compensation bead at least partially filled with a flowable material.

Such a filled compensation bead exhibits a damped-elastic oscillation behaviour and in the event of a change in the local sealing gap height adapts to a new average bead height in accordance with an exponential function with a relaxation time $\tau$, SO that the damped-elastic compensation element thus formed only performs heavily damped oscillations around the average local bead height, which is particularly beneficial for an efficient compensation of the operating status-related change in average local sealing gap height.

The flowable material can be polytetrafluoroethylene or a modified polytetrafluoroethylene, for example.

The term modified polytetrafluoroethylene in this case relates to a substance similar to polytetrafluoroethylene, in which the molecular structure of the polytetrafluoroethylene has been chemically modified by partially substituting the fluorine atoms of the polytetrafluoroethylene by substituents.

Organic or inorganic fillers can be added to the polytetrafluoroethylene or modified polytetrafluoroethylene.

In addition, a metallic material, in particular a metal alloy, preferably a Pb alloy, e.g. a Pb—Sn alloy, may also be used as flowable material.

Local sealing gap changes caused by the change in operating status of the engine can be compensated particularly favourably as a result of the flowable material in the compensation means, since the flowable material can be distributed differently along the periphery of the compensation means as a function of the respective pressure conditions in each operating status of the engine.

If it is advantageously provided that the flowable material is disposed in a closed chamber, then the total volume of the flowable material in the compensation means is essentially constant as a result of this, and therefore a local increase or decrease in the damped-elastic compensation element occurs with a correspondingly opposed decrease or increase thereof at a different location in the peripheral direction of the combustion chamber opening.

The closed chamber can be formed, in particular, by two interconnected gasket sheets of the cylinder head gasket.

The two gasket sheets can be connected to one another, for example, by welding.

Alternatively or in addition to a damped-elastic compensation element, the compensation means can comprise at least one compensation element that is changeable in height in a plastically reversible manner.

A compensation element that is changeable in height in a plastically reversible manner is a compensation element which changes its height by plastic deformation with a change in operating status of the engine, wherein this change in height is substantially reversed again when the operating status of the engine returns to the initial status.

In particular, such a plastically reversible compensation element can comprise a chamber at least partially filled with a flowable material.

This chamber can be formed by two interconnected gasket sheets of the cylinder head gasket.

These two gasket sheets can be connected to one another, for example, by welding.

In addition, it is advantageously provided that at least one of the gasket sheets forming the chamber is provided with at least one angled bend.

Further features and advantages of the invention are the subject of the following description and the drawing representing an embodiment.

Identical or functionally equivalent elements are given the same reference numerals in all the figures.

Figure 1:
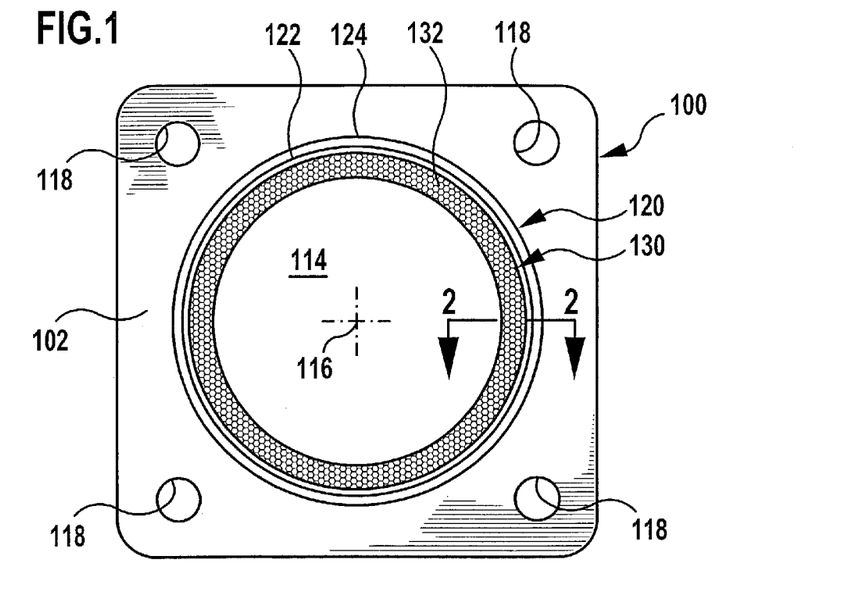
FIG. 1 is a schematic top view onto a cylinder head gasket with a combustion chamber opening, a combustion chamber bead, the height of which may be elastically deformed and surrounds the combustion chamber opening, and with a deformation limiting means limiting the deformation of the combustion chamber bead.
Figure 2:
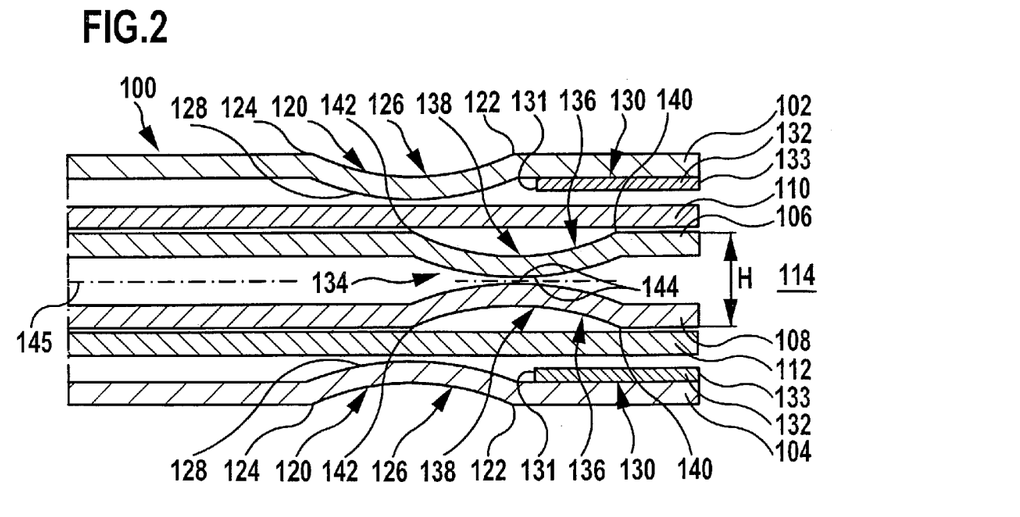
FIG. 2 is a schematic section through the cylinder head gasket from FIG. 1 along line 2-2 in FIG. 1 in the case of a first embodiment of the cylinder head gasket, which comprises a compensation means with two elastic compensation beads.

A cylinder head gasket shown in FIGS. 1 and 2 and given the overall reference 100, best seen from FIG. 2, comprises an upper beaded cover sheet 102, a lower beaded cover sheet 104, an upper compensation sheet 106 disposed between the upper beaded cover sheet 102 and the lower beaded cover sheet 104, a lower compensation sheet 108 disposed between the upper compensation sheet 106 and the lower beaded cover sheet 104, an upper intermediate sheet 110 disposed between the upper beaded cover sheet 102 and the upper compensation sheet 106 and also a lower intermediate sheet 112 disposed between the lower beaded cover sheet 104 and the lower compensation sheet 108.

Each of the sheets of the cylinder head gasket is formed from an essentially metallic material by stamping and has an essentially circular combustion chamber opening 114 with a central point 116, wherein the combustion chamber openings 114 in the different sheets of the cylinder head gasket 100 are essentially flush with one another.

Moreover, each of the sheets of the cylinder head gasket 100 is provided with several fastening element openings 118, which allow the passage of fastening elements, in particular cylinder head screws, by means of which the engine components (engine block and cylinder head) adjoining the cylinder head gasket 100 are held in position relative to one another, through the cylinder head gasket 100, wherein the fastening element openings 118 of the different sheets of the cylinder head gasket 100 are essentially flush with one another.

To seal the combustion chamber against the exit of fuel gases, the upper beaded cover sheet 102 and the lower beaded cover sheet 104 are respectively provided with a combustion chamber bead 120 enclosing the combustion chamber opening 114 in a ring shape.

In the embodiment described here, the combustion chamber beads 120 are configured as full beads with an essentially U-shaped cross-section, which are bordered towards the combustion chamber opening 114 by an inner bead edge 122 and on their side remote from the combustion chamber opening 114 by an outer bead edge 124. The region of the upper beaded cover sheet 102 or the lower cover sheet 104 located between the inner bead edge 122 and the outer bead edge 124 respectively forms a bead contact region 126, which is arched towards the respectively adjacent intermediate sheet 110 or 112 and its dome 128 defines the sealing line of the respective bead 120.

To ensure that the beads 120 cannot be excessively flattened out under the effect of the pressure forces generated by the cylinder head screws and of the periodically fluctuating pressures occurring during engine operation, each of the combustion chamber beads 120 respectively has an associated deformation limiting device 130, which is usually also referred to as a stopper.

In the embodiments shown here, each of the deformation limiting means 130 respectively comprises a ring-shaped deformation limiting element 132, which is disposed in the region between the respective combustion chamber bead 120 and the combustion chamber opening 114 and is fixed, e.g. by welding, on the side of the respective beaded cover sheet 102, 104 on which the respective combustion chamber bead 120 arches.

Alternatively, the deformation limiting means 130 could also be formed, for example, by flanging the edge region of the respective beaded cover sheet 102, 104 adjoining the combustion chamber opening 114.

Moreover, the deformation limiting means 130 could also be disposed on the intermediate sheets 110, 112 instead of on the beaded cover sheets 102, 104.

The respectively associated combustion chamber bead 120 is protected from impermissible deformation by the deformation limiting means 130, so that no cracks occur in the cover sheets 102, 104 in the region of the combustion chamber bead 120 during engine operation and the combustion beads 120 retain the necessary resilient properties.

In order to compensate variations in the dynamic oscillation of the sealing gap between the engine block and the cylinder block that are dependent on the operating status, the cylinder head gasket 100 additionally has a compensation means given the overall reference 134, which in the first embodiment of a cylinder head gasket 100 shown in FIG. 2 comprises two elastic compensation elements 136, which are respectively configured as a compensation bead 138 provided on one of the compensation sheets 106, 108.

Each of the compensation beads 138 that are elastically changeable in height extends in a ring shape around the combustion chamber opening 114 and is bordered towards the combustion chamber opening 114 by an inner bead edge 140, which runs between the radially inner edge 133 and the radially outer edge 131 of the deformation limiting element 132.

On their side remote from the combustion chamber opening 114, each of the compensation beads 138 is bordered by an outer bead edge 142, which runs between the inner bead edge 122 and the outer bead edge 124 of the combustion chamber bead 120 and is preferably at essentially the same distance from the central point 116 of the combustion chamber opening 114 as the dome 128 defining the sealing line of the combustion chamber bead 120.

The domes 144 of the two compensation beads 138 face one another and both are at essentially the same distance from the central point 116 of the combustion chamber opening 114 as the inner bead edge 122 of the combustion chamber beads 120.

The upper intermediate sheet 110 disposed between the upper compensation sheet 106 and the upper beaded cover sheet 102 prevents the bead edges 140, 142 of the compensation bead 138 of the upper compensation sheet 106 from penetrating into the combustion chamber bead 120 or into the deformation limiting element 132 on the upper beaded cover sheet 102 and thus damaging the combustion chamber bead 120 or the deformation limiting element 132 and impairing the function thereof.

In a corresponding manner, the lower intermediate sheet 112 disposed between the lower compensation sheet 108 and the lower beaded cover sheet 104 prevents damage to the combustion chamber bead 120 and the deformation limiting element 132 on the lower beaded cover sheet 104 through the bead edges 140, 142 of the compensation bead 138 of the lower compensation sheet 108.

The compensation means 134 is symmetric to a central plane thereof, which is oriented parallel to the main faces of the gasket sheets of the cylinder head gasket 100.

Because the compensation beads 138—viewed perpendicular to the main faces of the sheets of the cylinder head gasket 100—respectively partially overlap both the combustion chamber beads 120 and the deformation limiting elements 132 of the deformation limiting means 130, the compensation means 134 at least partially supports both the combustion beads 120 and the deformation limiting means 130, so that a change in height H of the compensation means 134, which is a combination of the heights of both compensation beads 138, has an equal effect on both the combustion chamber beads 120 and the deformation limiting means 130.

In this case, the height of the element within the scope of this description and the attached claims refers to the extension of the respective element in a direction perpendicular to the main faces of the sheets of the cylinder head gasket 100.

If the average sealing gap height increases at a location of the periphery of the combustion chamber opening 114, then the compensation beads 138 resiliently extend, and the total height H of the compensation means 134 increases, as a result of which the local sealing gap increase dependent on the operating status is compensated again.

As a result of this compensation effect of the compensation means 134, the dynamic sealing gap oscillations acting on the combustion chamber beads 120 and the deformation limiting means 130 undergo a smaller operating status-related change than would be the case without the compensation means 134.

Ideally, the changes in dynamic sealing gap oscillations are essentially fully compensated by the compensation means 134, so that the combustion chamber beads 120 and the deformation limiting means 130 are subjected to essentially the same pressure conditions in each operating status of the cylinder head gasket 100. As a result, the structure of the deformation limiting element 132 of the deformation limiting means 130 in particular can be optimised for these essentially constant pressure conditions.

In particular, it can be provided that the height and/or width of the deformation limiting element 132 varies in the peripheral direction of the combustion chamber opening 114 in order to compensate as far as possible any local irregularities in the pressure distribution, which can be caused by locally different rigidity values and/or heat expansion values of the engine components adjoining the cylinder head gasket 100 or by different distances from the cylinder head screws clamping the adjoining engine components together.

If the average local sealing gap height decreases at a location on the periphery of the combustion chamber opening 114, then the compensation beads 138 are pressed flatter, so that the total height H of the compensation means 134 is reduced and in this way the local change in the sealing gap height dependent on operating status is compensated.

As a result of the intermediate sheets 110 and 112 the compensation means 134 acts essentially uniformly on the combustion chamber beads 120 and on the deformation limiting means 130, so that the combustion chamber beads 120 are held at a virtually constant shunt value.

Therefore, when the operating status of the cylinder head gasket 100 changes, the deformation limiting means 130 and the respectively associated combustion chamber beads 120 always expand resiliently together.

The entire variation in height H of the compensation means 134 preferably amounts to 100 μm at maximum, in particular 40 μm at maximum.

The cross-section of the compensation beads 138 is preferably structured and the material thickness and mechanical properties of the compensation sheets 106, 108 in relation to those of the beaded cover sheets 102, 104 are selected in such a manner that the compensation beads 138 has a clearly lower resonance frequency than the combustion chamber beads 120.

Figure 3:
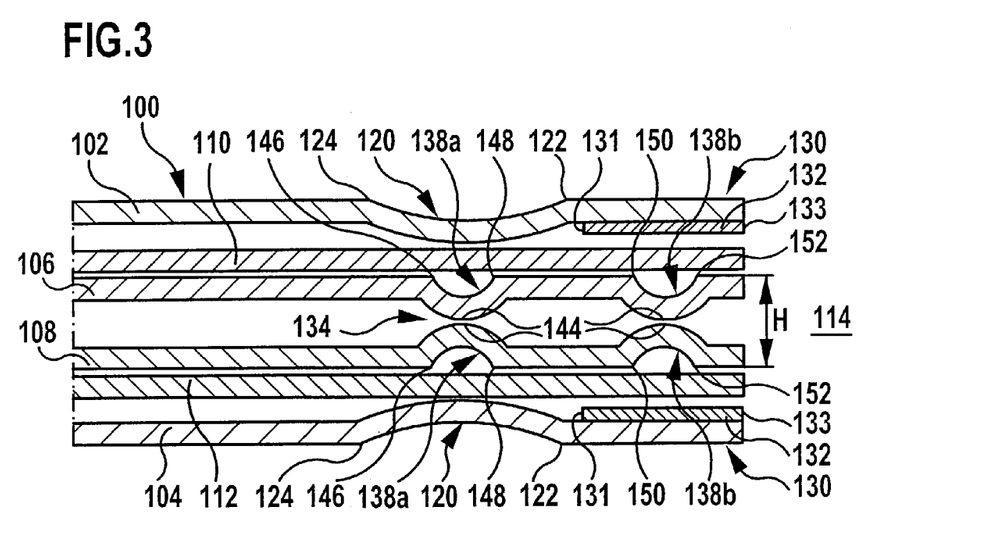
FIG. 3 is a schematic cross-section corresponding to the view in FIG. 2 through a second embodiment of a cylinder head gasket with a compensation means comprising two pairs of compensation beads, wherein the compensation beads of one pair respectively face one another.

A second embodiment of a cylinder head gasket 100 shown in FIG. 3 differs from the above-described first embodiment in that the compensation sheets 106, 108 do not each have only one compensation bead 138, but instead respectively have two elastic compensation beads 138*a* and 138*b*.

The respective radially outer compensation beads 138*a* support the combustion chamber beads 120 and are bordered to the outside by an outer bead edge 146, which is at a shorter distance from the central point of the combustion chamber opening 114 than the outer bead edge 124 of the combustion chamber beads 120, and is bordered to the inside by an inner bead edge 148, which is at a greater distance from the central point 116 of the combustion chamber opening 114 than the inner bead edge 122 of the combustion chamber 120.

The radially inner compensation beads 138*b* support the deformation limiting means 130 and are bordered to the outside by an outer bead edge 150, which is at a shorter distance from the central point 116 of the combustion chamber opening 114 than the outer edge 131 of the deformation limiting elements 132, and is bordered to the inside by an inner bead edge 152, which is at a greater distance from the central point 116 of the combustion chamber opening 114 than the inner edge 133 of the deformation limiting elements 132.

The cross-sections of the inner compensation beads 138*b* and the outer compensation beads 138*a* are essentially the same, and therefore the inner compensation beads 138*b* and the outer compensation beads 138*a* have essentially the same height in each operating status of the gasket.

This ensures that changes in the sealing gap height dependent on operating status are compensated by the compensation means 134 in the region of the combustion chamber beads 120 in essentially the same manner as in the region of the deformation limiting means 130.

The domes 144 of the inner compensation beads 138*b* touch along the inner sealing line of the compensation means 134, and the domes 144 of the outer compensation beads 138*a* touch along the outer sealing line of the compensation means 134, and therefore the second embodiment of the cylinder head gasket 100 has two sealing lines located one behind the other in the radial direction of the combustion chamber opening 114, whereas the first embodiment of the cylinder head gasket 100 shown in FIG. 2 has only one such sealing line inside the compensation means 134.

Therefore, a better seal of the combustion chamber is assured in the case of the second embodiment of the cylinder head gasket 100.

Otherwise, the second embodiment of a cylinder head gasket 100 is the same as the first embodiment with respect to its structure and function, and reference should be made to the above description in this regard.

Figure 4:
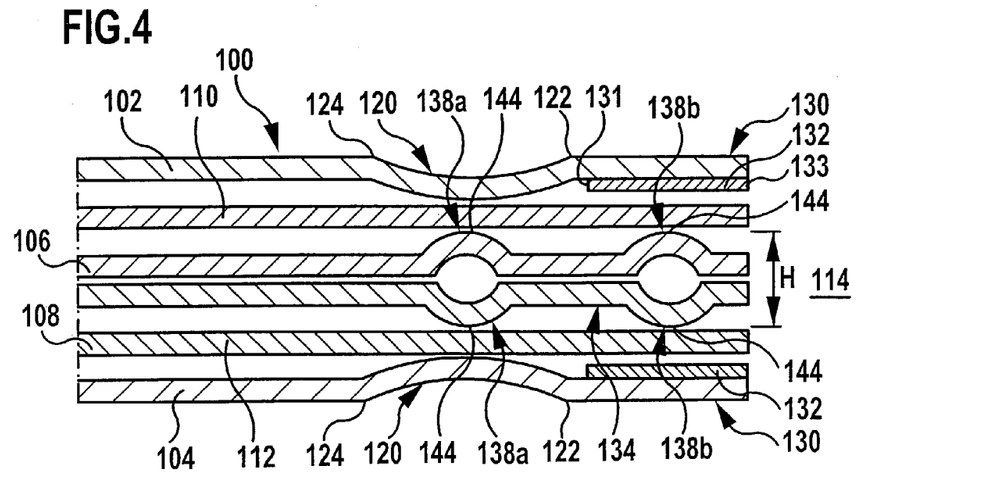
FIG. 4 is a schematic cross-section corresponding to FIG. 2 through a third embodiment of a cylinder head gasket with a compensation means, which comprises two pairs of compensation beads, wherein the compensation beads of one pair respectively face away from one another.

A third embodiment of cylinder head gasket 100 shown in FIG. 4 differs from the above-described second embodiment merely in that the domes 144 of the compensation beads 138*a*, 138*b* of the upper compensation sheet 106, on the one hand, and the lower compensation sheet 108, on the other,—as in the second embodiment—do not face one another but face away from one another, so that the compensation beads 1138*a*, 138*b* arch towards the respective adjoining intermediate sheet 110 or 112.

Otherwise, the third embodiment of a cylinder head gasket 100 is the same as the second embodiment with respect to its structure and function, and reference should be made to the above description in this regard.

Figure 5:
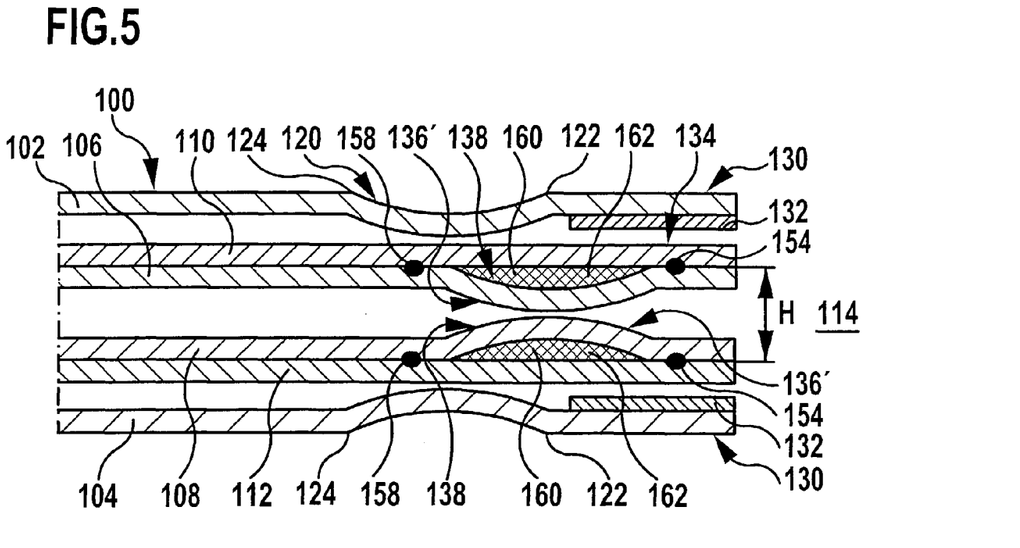
FIG. 5 is a schematic cross-section corresponding to FIG. 2 through a fourth embodiment of a cylinder head gasket with a compensation means, which comprises two damped-elastic compensation elements.

A fourth embodiment of a cylinder head gasket 100 shown in FIG. 5 differs from the above-described first embodiment in that the compensation sheets 106, 108 and the respectively adjoining intermediate sheets 110 or 112 are not freely moveable in relation to one another, but are fixed to one another along a respective inner weld 154 and along an outer weld 158 to form between the compensation bead 138 of the respective compensation sheet 106, 108, on the one hand, and the respectively associated intermediate sheet 110 or 112, on the other, a closed chamber, which is filled with a flowable material 162.

This flowable material can be polytetrafluoroethylene or a modified polytetrafluoroethylene, for example.

In addition, a metallic material, in particular a metal alloy, preferably a Pb alloy, e.g. a Pb—Sn alloy, may also be used as flowable material.

As a result of the compensation beads 138 being filled with the flowable material 162 in the chambers 160, the compensation elements 136' of the compensation means 134 are not purely elastic compensation elements, as in the case of the first three embodiments of the cylinder head gasket 100, but rather dampedelastic compensation elements 136', which exhibit a damped-elastic oscillation behaviour and in the event of a change in the average sealing gap height adapt to a new bead height in accordance with an exponential function with a relaxation time τ, so that the total height H of the compensation means 134 also follows a change in the operating status of the engine with the relaxation time τ.

Since the chambers 160 are closed, the total volume of flowable material 162 in the chambers 160 remains substantially constant, and therefore a local increase or decrease in the damped-elastic compensation elements 136' occurs with a correspondingly opposed decrease or increase thereof at a different location in the peripheral direction of the combustion chamber opening.

The change in height H averaged over the periphery of the compensation means 134 is therefore essentially equal to zero in this embodiment.

Nevertheless, local sealing gap changes, which are caused by a change in the operating status of the engine, can be compensated by the compensation means 134, since the flowable material 162 can be distributed differently along the periphery of the compensation means 134 as a function of the respective pressure conditions in each operating status of the engine.

Otherwise, the fourth embodiment of a cylinder head gasket 100 is the same as the first embodiment with respect to its structure and function, and reference should be made to the above description in this regard.

Figure 6:
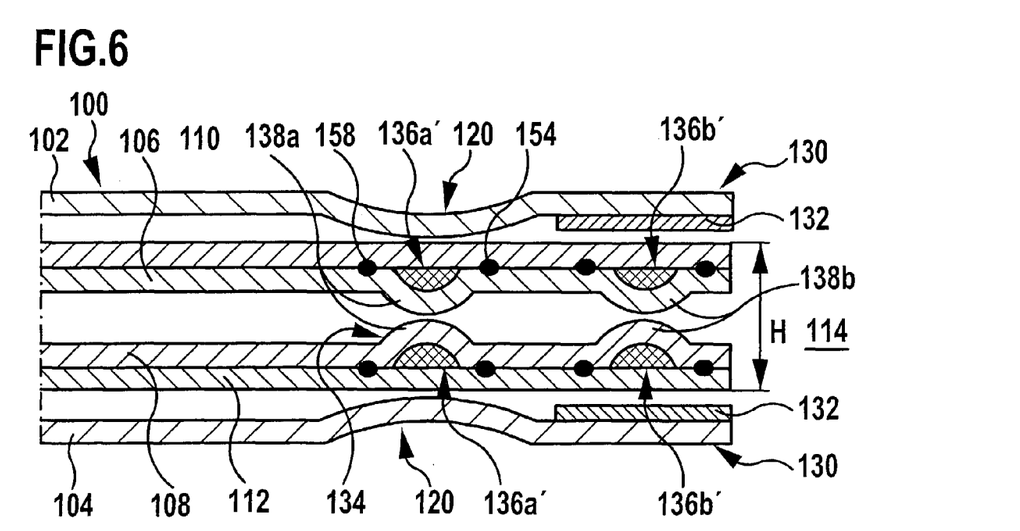
FIG. 6 is a schematic cross-section corresponding to FIG. 2 through a fifth embodiment of a cylinder head gasket with a compensation means, which comprises four damped-elastic compensation elements.

A fifth embodiment of a cylinder head gasket 100 shown in FIG. 6 differs from the fourth embodiment shown in FIG. 5 merely in that the compensation means 134 does not only comprise a damped-elastic compensation element 136' on each compensation sheet 106, 108, but instead respectively comprises an outer compensation element 136a' and an inner compensation element 136b'.

In this case, the outer compensation elements 136a' support the combustion chamber beads 120 and the inner compensation elements 136b' support the deformation limiting means 130.

The compensation elements 136a' and 136b' correspond in structure to the damped-elastic compensation elements 136' of the fourth embodiment.

The configuration and arrangement of the outer and inner compensation beads 138a and 138b of this embodiment are the same as those of the above-described second embodiment shown in FIG. 3.

Figure 7:
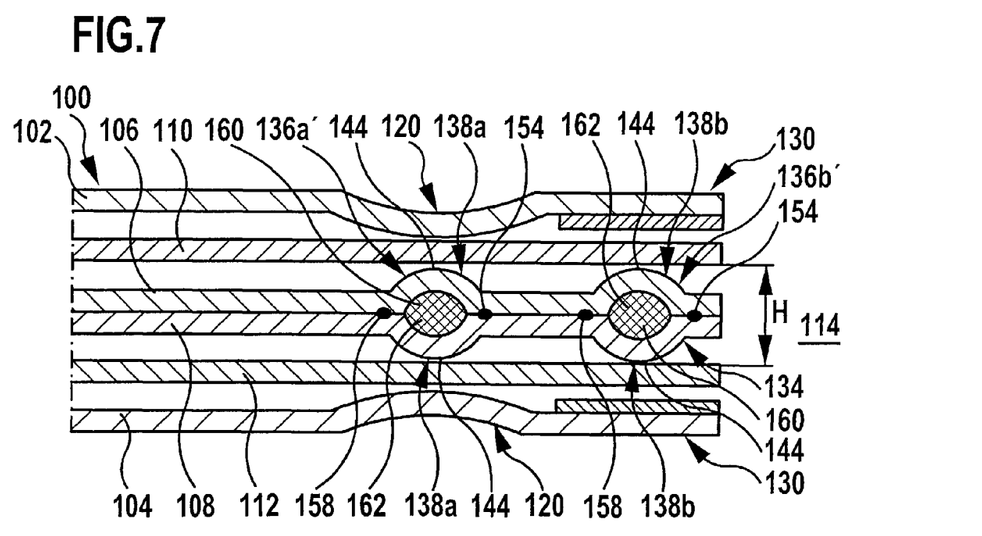
FIG. 7 is a schematic cross-section corresponding to FIG. 2 through a sixth embodiment of a cylinder head gasket with a compensation means, which comprises two damped-elastic compensation elements.

A sixth embodiment of a cylinder head gasket 100 shown in FIG. 7 differs from the above-described fifth embodiment in that the outer compensation beads 138a and the inner compensation beads 138b on the compensation sheets 106, 108 do not have domes facing one another, but instead have domes 144 facing away from one another.

Moreover, the compensation sheets 106 and 108 are not fixed to the respectively adjacent intermediate sheet 110 or 112, but are instead fixed to one another by means of four welds 154, 158, in which case two closed chambers 160 are formed which are bordered respectively by two compensation beads 138a or 138b, an associated inner weld 154 and an associated outer weld 158, and are filled with a flowable material 162.

In this way, the compensation means 134 of the cylinder head gasket 100 comprises an outer damped-elastic compensation element 136a', which supports the combustion chamber beads 120, and an inner damped-elastic compensation element 136b', which supports the deformation limiting means 130.

The domes 144 of the compensation beads 138a of the outer compensation element 136a' in this case define two outer sealing lines, and the domes 144 of the compensation beads 138b of the inner compensation element 136b' define two inner sealing lines of the compensation means 134.

Otherwise, the sixth embodiment of a cylinder head gasket is the same as the fifth embodiment with respect to its structure and function, and reference should be made to the above description in this regard.

Figure 8:
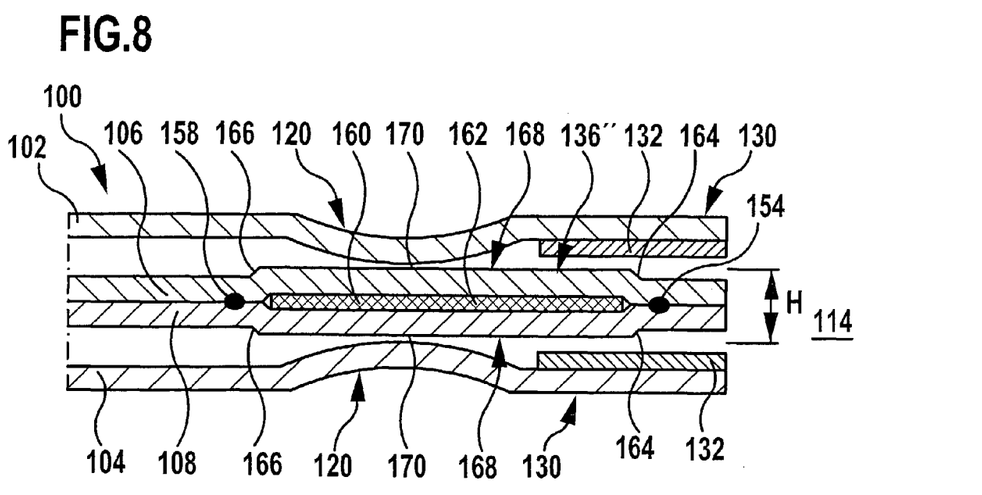
FIG. 8 is a schematic cross-section corresponding to FIG. 2 through a seventh embodiment of a cylinder head gasket with a compensation means, which comprises a plastically reversible compensation element.

A seventh embodiment of a cylinder head gasket 100 shown in FIG. 8 differs from the above-described fourth embodiment in that no intermediate sheets are provided between the beaded cover sheets 102, 104, on the one hand, and the compensation sheets 106, 108, on the other.

In addition, the compensation sheets 106 and 108 have no elastic compensation beads, but instead respectively have an inner angled bend 164 and an outer angled bend 166, which respectively extend around the combustion chamber opening 114 in a ring shape.

An abutment region 168, which projects over the other regions of the respective compensation sheet 106, 108 and against which the combustion chamber bead 120 of the respectively adjacent bead cover sheet 102 or 104 abuts in the operating position of the cylinder head gasket 100, is respectively located between the inner angled bend 164 and the outer angled bend 166 of each compensation sheet 106, 108.

The two compensation sheets 106, 108 are fixed to one another along an inner weld 154 located radially inside the inner angled bends 164 and along an outer weld 158 located radially outside the outer angled bends 166, so that a closed chamber 160, which is filled with a flowable material 162, is formed between the two abutment regions 168 of the compensation sheets 106, 108.

The abutment regions 168, the angled bends 164 and 166 and also the closed chambers 160 filled with the flowable material 162 together form a plastically reversible compensation element 136" of the compensation means 134 of the seventh embodiment of a cylinder head gasket 100.

In the event of changes in the operating status of the engine and associated changes in the local sealing gap height, the flowable material 162 can be distributed by flowing in the peripheral direction of the chamber 160 in such a manner that the respective local changes in sealing gap height are compensated by a corresponding change in the height of the plastically reversible compensation element 136".

The height H of the compensation element 136" in this case corresponds to the distance between the abutment faces 170 of the abutment regions 168 of the compensation sheets 106, 108 facing the combustion chamber beads 120.

Since, contrary to the compensation means of the above-described embodiments formed with elastic or damped-elastic compensation elements, the plastically reversible compensation element 136" does not exhibit an elastic oscillation behaviour, and instead its height H changes only with a change in operating status of the engine, i.e. with a relaxation time in the range of several minutes, this embodiment is particularly well suited to compensating variations in the pressure distribution along the periphery of the combustion chamber opening 114 caused by a change in operating status of the engine, in particular its temperature, and in this case excluding both an impermissible deformation of the combustion chamber beads 120 and too great a drop in the sealing surface pressure at the sealing lines of the combustion chamber beads 120.

Otherwise, the seventh embodiment of a cylinder head gasket 100 is the same as the fourth embodiment with respect to its structure and function, and reference should be made to the above description in this regard.

The invention claimed is:

1. Cylinder head gasket comprising at least one gasket sheet with at least one combustion chamber opening and a combustion chamber bead, which combustion chamber bead is elastically deformable with regard to its height and surrounds the combustion chamber opening, and at least one deformation limiting means limiting the deformation of the combustion chamber bead, wherein the cylinder head gasket comprises a compensation means which comprises at least one compensation bead having a higher rigidity than the combustion chamber bead and extending in a peripheral direction of the combustion chamber opening, said at least one compensation bead having a full bead dome shape in cross-section with a deformable dome height of said at least one compensation bead being essentially reversibly changed locally along said peripheral direction where there is a change in local sealing gap height when the operating status of an engine in which the gasket is installed changes, and which compensation means at least partially supports both the combustion chamber bead and the deformation limiting means, wherein an outer bead edge of at least one of the at least one compensation bead runs at a greater distance from a central point of the combustion chamber opening than an inner bead edge of the combustion chamber bead.

2. Cylinder head gasket according to claim 1, wherein the height of the at least one compensation bead is adapted to vary as a function of the temperature of engine components adjoining the cylinder head gasket.

3. Cylinder head gasket according to claim 1, wherein the height of the at least one compensation bead is adapted to vary as a function of local surface pressure acting on the cylinder head gasket.

4. Cylinder head gasket according to claim 1, wherein the height of the at least one compensation bead is adapted to change in dependence on the operating status of the engine with a relaxation time, which is greater than one work cycle of the engine.

5. Cylinder head gasket according to claim 4, wherein the relaxation time is greater than $1/10$ of a second.

6. Cylinder head gasket according to claim 1, wherein the at least one compensation bead extends in the longitudinal direction of the combustion chamber bead, and that the change in height of the at least one compensation bead is adapted to vary in the longitudinal direction of the at least one compensation bead as a function of the operating status of the engine.

7. Cylinder head gasket according to claim 6, wherein the change in height of the at least one compensation bead dependent on operating status averaged over the entire length of the at least one compensation bead is essentially zero.

8. Cylinder head gasket according to claim 1, wherein the at least one compensation bead at least partially supports both the combustion chamber bead and the deformation limiting means.

9. Cylinder head gasket according to claim 1, wherein the compensation means comprises at least one compensation element, which at least partially supports the combustion chamber bead, and at least one further compensation element, which at least partially supports the deformation limiting means.

10. Cylinder head gasket according to claim 1, wherein the total height of the compensation elements supporting the combustion chamber bead is essentially equal to the total height of the compensation elements supporting the deformation limiting means.

11. Cylinder head gasket according to claim 1, wherein the compensation means comprises at least one compensation sheet on which the at least one compensation bead is disposed, which differs from the gasket sheet of the cylinder head gasket provided with the combustion chamber bead.

12. Cylinder head gasket according to claim 11, wherein the compensation means comprises at least two compensation sheets, which differ from the gasket sheet of the cylinder head gasket provided with the combustion chamber bead.

13. Cylinder head gasket according to claim 1, wherein the compensation means is substantially mirror-symmetric to a central plane of the compensation means.

14. Cylinder head gasket according to claim 1, wherein the compensation means comprises the at least one compensation bead which is elastically changeable in height.

15. Cylinder head gasket according to claim 1, wherein an inner bead edge of the at least one compensation bead runs at a shorter distance from a central point of the combustion chamber opening than an outer edge of the deformation limiting means.

16. Cylinder head gasket according to claim 1, wherein the compensation means comprises at least two compensation beads.

17. Cylinder head gasket according to claim 16, wherein at least two compensation beads are provided on the same compensation sheet of the compensation means.

18. Cylinder head gasket according to claim 16, wherein at least two compensation beads are provided on two different compensation sheets of the compensation means.

19. Cylinder head gasket according to claim 18, wherein the compensation beads are configured as full beads, the domes of which face one another.

20. Cylinder head gasket according to claim 18, wherein the compensation beads are configured as full beads, the domes of which face away from one another.

21. Cylinder head gasket according to claim 1, wherein the compensation means comprises at least one compensation bead at least partially filled with a flowable material.

22. Cylinder head gasket according to claim 21, wherein the flowable material is disposed in a closed chamber.

23. Cylinder head gasket according to claim 22, wherein the closed chamber is formed by two interconnected gasket sheets of the cylinder head gasket.

24. Cylinder head gasket according to claim 23, wherein the two gasket sheets are connected to one another by welding.

25. Cylinder head gasket according to claim 1, wherein the compensation means comprises at least one compensation element that is changeable in height in a plastically reversible manner.

26. Cylinder head gasket according to claim 25, wherein the plastically reversible compensation element comprises a chamber at least partially filled with a flowable material.

27. Cylinder head gasket according to claim 26, wherein the chamber is formed by two interconnected gasket sheets of the cylinder head gasket.

28. Cylinder head gasket according to claim 27, wherein the two gasket sheets are connected to one another by welding.

29. Cylinder head gasket according to claim 27, wherein at least one of the gasket sheets forming the chamber is provided with at least one angled bend.

30. Cylinder head gasket according to claim 5, wherein the relaxation time is greater than 1 second.

31. Cylinder head gasket according to claim 30, wherein the relaxation time is greater than 1 minute.

32. Cylinder head gasket according to claim 1, wherein the deformable dome height of said at least one compensation bead is changeable by being essentially reversibly flattened or extended locally along said peripheral direction in response to a change in the local sealing gap height.

33. Cylinder head gasket comprising at least one gasket sheet with at least one combustion chamber opening and a combustion chamber bead, which combustion chamber bead is elastically deformable with regard to its height and surrounds the combustion chamber opening, and at least one deformation limiting means limiting the deformation of the combustion chamber bead, wherein the cylinder head gasket comprises a compensation means which comprises at least one compensation sheet having at least one compensation bead having a higher rigidity than the combustion chamber bead and extending in a peripheral direction of the combustion chamber opening, a deformable height of said at least one compensation bead being essentially reversibly changed locally along said peripheral direction where there is a change in local sealing gap height when the operating temperature of an engine in which the gasket is installed changes, said deformable height being different from an edge thickness of said compensation sheet that borders the combustion chamber opening at a given engine operating temperature, and which compensation means at least partially supports both the combustion chamber bead and the deformation limiting means, wherein an outer bead edge of at least one of the at least one compensation bead runs at a greater distance from a central point of the combustion chamber opening than an inner bead edge of the combustion chamber bead.

* * * * *